US 6,556,941 B2

(12) United States Patent
Mallory et al.

(10) Patent No.: US 6,556,941 B2
(45) Date of Patent: Apr. 29, 2003

(54) SEPARATION OF PERIODIC AND NON-PERIODIC SIGNAL COMPONENTS

(75) Inventors: Roy E. Mallory, Bedford, MA (US); Neil Judell, Andover, MA (US)

(73) Assignee: ADE Corporation, Westwood, MA (US)

( * ) Notice: Subject to any disclaimer, the term of this patent is extended or adjusted under 35 U.S.C. 154(b) by 0 days.

(21) Appl. No.: 10/029,753

(22) Filed: Oct. 29, 2001

(65) Prior Publication Data

US 2002/0082786 A1 Jun. 27, 2002

Related U.S. Application Data

(60) Provisional application No. 60/243,919, filed on Oct. 27, 2000.

(51) Int. Cl.[7] ................................................. H02P 7/64
(52) U.S. Cl. ........................ 702/147; 714/707; 318/807
(58) Field of Search ................... 702/75, 147; 367/135; 73/117.3; 324/751; 318/801; 700/188; 714/707

(56) References Cited

U.S. PATENT DOCUMENTS 5,864,217 A * 1/1999 Lyons et al. ................. 318/652
6,087,801 A * 7/2000 Bethoux et al. .......... 318/568.1
6,324,030 B1 * 11/2001 Cheung et al. ........... 360/77.02

* cited by examiner

Primary Examiner—Kamini Shah
(74) Attorney, Agent, or Firm—Weingarten, Schurgin, Gagnebin & Lebovici LLP

(57) ABSTRACT

A process for obtaining the periodic component in a data vector of data taken of a sensed property of an element driven by one or more rotary components over several rotations. The procedure comprises first forming the data vector asynchronously with respect to rotation of said one or more rotary components. A series of marker signals representing the rotation of the one or more rotary components is also established. From these the periodic component of data in said data vector is determined as a function of the data in the data vector and the marker signals.

4 Claims, 1 Drawing Sheet

SEPARATION OF PERIODIC AND NON-PERIODIC SIGNAL COMPONENTS

CROSS REFERENCE TO RELATED APPLICATIONS

This application claims priority under 35 U.S.C. §119 (e) to Provisional Patent Application Serial No. 60/243,919 filed Oct. 27, 2000; the disclosure of which is incorporated by reference herein.

STATEMENT REGARDING FEDERALLY SPONSORED RESEARCH OR DEVELOPMENT

N/A

BACKGROUND OF THE INVENTION

It is sometimes useful to be able to separate those parts of a signal that are periodic with respect to some function of time from the parts that are non-periodic with respect to time. This ability is commonly used in the analysis of rotating machinery such as spindles and computer disk-drive motors. In the machine tool industry and the disk-drive industry, such non-periodic motion is usually referred to as asynchronous error motion or non-repeatable run-out. In fact, these measurements are so well known that both IDEMA (the trade association for the data storage industry) and ANSI (American National Standards Institute) have specifications (T17–91 and B89.3.4.M, respectively) describing how to perform the measurements.

As an example of why such measurements are important, consider the radial run-out of a ball-bearing spindle. The run-out signal will contain certain components that are periodic with respect to the spindle's rotation rate. These signals would include a component at the rotation rate caused by imperfect centering, as well as frequency components at integral numbers of the rotation rate caused by imperfect circularity. Non-periodic components will also be present. The rate at which the balls in the ball bearing precess around the shaft commonly causes an asynchronous signal as do non-circularity of the balls and vibrations of the spindle.

In the prior art, these measurements, as typified by IDEMA spec T17–91, are made by synchronously sampling the radial or axial position of the rotating part at a rate many times its rotational rate, over some number of revolutions. Because the sampling is synchronous with the rotational rate, the samples repetitively occur at fixed spots on the sampled part. So, if the part were sampled N times per revolution, there would be N spots at equal angular spacing around the part that are sampled once per revolution. The peak-to-peak variation in the reading obtained at each spot over the sampled revolutions represents the asynchronous run-out at that spot. The average of all readings at each spot represents the synchronous position at that spot. The peak-to-peak value of all synchronous positions is often used to calculate the synchronous error motion, or synchronous TIR. The largest of the asynchronous error motions as measured at each spot, is often considered to be the asynchronous error motion of the unit under test.

This method of calculating synchronous and asynchronous error motion by using synchronous sampling has several disadvantages. First, different angular rotation rates, or different numbers of samples per revolution require different sample rates. This requirement increases the cost and complexity of the equipment used to make the samples. In addition, it also increases the complexity of digitally filtering the sampled data, which is often desirable.

Another problem is the generation of the trigger signals used to make the synchronous samples. It is most advantageous to have the signals generated by the rotating part itself such as could be accomplished by using a rotary encoder connected to the rotating part. However, it is often impossible to use this technique, and instead, the trigger signals are commonly generated by an electronic circuit. Such circuits are fed a once-per-revolution pulse, and from this, generate N pulses per revolution by means of some frequency multiplication technique. Such techniques can have jitter and cannot precisely follow variations in the rotating part's angular speed. In addition, they add considerable cost and complexity to the system.

A more subtle problem is the under calculation of asynchronous signals at certain frequencies relative to the rotational frequency. Consider an asynchronous signal that occurs at $\frac{2}{3}$rds the rotational frequency. Although such a signal is non-periodic and is considered to be part of asynchronous error motion, we note that 3 times $\frac{2}{3}$rds equals 2, so the signal at this frequency will cause a pattern that repeats every three revolutions. Because of this repetitive pattern, the asynchronous error motion of such a signal will be under calculated if the synchronous sampling technique is used.

BRIEF SUMMARY OF THE INVENTION

This patent teaches a new method that uses asynchronous sampling of the device under test. The technique eliminates all the disadvantages of the synchronous-sampling method discussed above. In the preferred embodiment of this method, a piece of rotating equipment—the Device Under Test (DUT)—is instrumented with a machine that measures some physical characteristic of the DUT as a function of time. The data are sampled at a rate significantly faster than the rotational period of the DUT and logged to a computer for a number of revolutions. At the same time, another instrument very accurately measures the time each revolution of the DUT takes. This measurement is typically made by using a once-per-revolution pulse commonly available from rotating machinery. Some physical characteristics of the DUT depend solely upon the rotational position of the device, and will be periodic with the rotation. Other physical characteristics of the DUT are not periodic with the rotation. The goal of the signal processing module is to separate the periodic and non-periodic portions of the logged data. Other aspects, features, and advantages of the present invention are disclosed in the detailed description that follows.

DESCRIPTION OF THE DRAWING

The invention is described below in the Detailed Description and in the accompanying drawings of which.

DETAILED DESCRIPTION OF THE INVENTION

Figure 1:
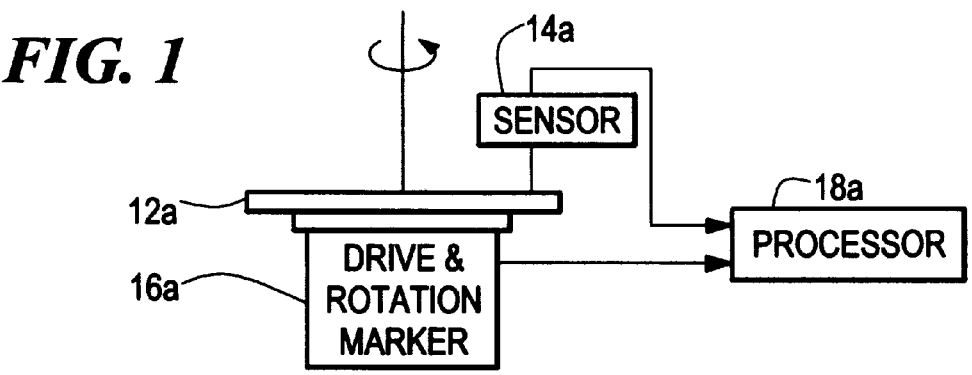
FIG. 1 is a diagram of a first area of application for the invention.
Figure 2:
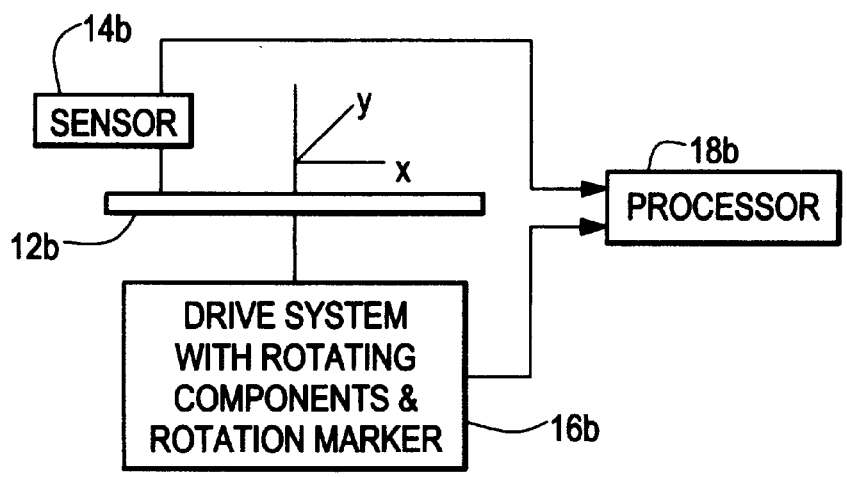
FIG. 2 is a diagram of a second area of application of the invention.

The present invention provides an accurate reading of the position of a moving element such as elements, 12a and 12b in FIGS. 1 and 2, having rotating parts in their drive systems. This in turn allows the correct location of element information sensed by sensors 14a and 14b to be determined. In the case of element 12a the rotary parts are within a drive system 16a that causes rotating motion of the element 12a. In the case of element 12b, a drive system 16b produces linear X,Y motion using rotating parts in the drive system 16b.

These rotary components account for a periodic error signal in the output of the sensors 14a and 14b. For example, in the case of capacitively, optically or otherwise detecting a surface or bulk property of the element 12a or 12b, which may be a semiconductor wafer or digital memory disk, there will be both periodic and non periodic components. Depending upon the application, it may be desirable to know one or the other separately and thus it is important to be able to separately measure at least one or the other, separately, allowing the non-measured component to be obtained where necessary by subtraction.

Figure 3:
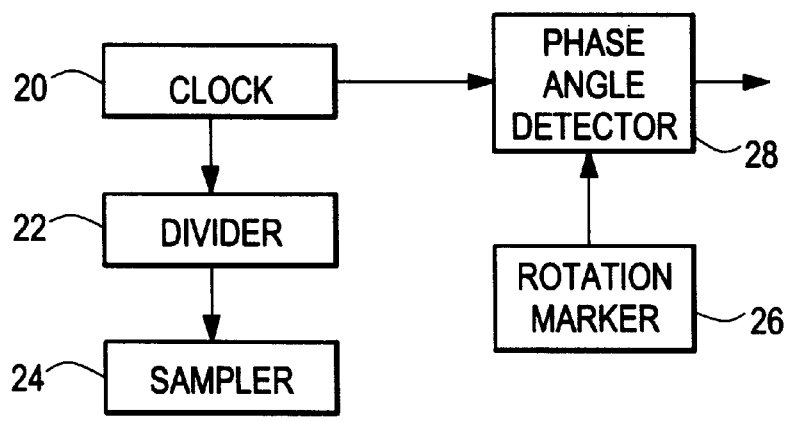
FIG. 3 is a block diagram of circuitry used in the application of the invention.

The invention needs only the signal of a rotation marker from drive units 16a or 16b providing an indication of the driven element 12a or 12b passing a reference point instead of requiring synchronous sensing where every sensor output would be associated with a position of the element 12a or 12b. The advantages of this system, as noted above, are the elimination of a dependence on speed and synchronization control and the error that comes from the more practical implementation rather than using artificial synchronizing signals electronically generated instead of those directly from the rotating part. The present invention only requires that any variation in element speed be minimal between revolutions and over a single revolution. These are not usually difficult constraints to realize The invention typically uses a single rotation tick to mark each passage of a reference point in the rotation cycle. These signals along with the output of the sensor's samples at a periodic rate determined by a clock 20, as shown in FIG. 3, running at high rate typically for high resolution. Accordingly, a divider 22 reduces the clock rate to a sample rate for use by a sampler 24 to sample each sensor output at the thus defined moment. Clock timing signals and the rotation marker reference signal from marker 26 are applied to a phase angle processing unit which may be hardware or software such as processors 18a and 18b that perform calculations as explained below to extract and phase correctly the periodic component.

The processing of the input data from the marker 26 and sensor's samples at periodic intervals creates a pattern of sensor output signals with the non-periodic component removed. The processing algorithm of Table I uses two separate approaches to extract the periodic component. The disclosure uses the conventions and the programming techniques of the MATLAB language of Mathworks of Natick Mass.

In accomplishing the extraction of the periodic and non-periodic components two embodiments are used in Table I below. The first embodiment follows the processing of steps of 1.1 through 1.4 while the second follows the steps 2.1 through 2.4.2 shown below. In the first embodiment, steps 1.1.1.1 through 1.1.1.4 set up the input of N samples over M revolutions into matrix form as InputData(x) a vector of N×1 size and Period(y) a vector of M×1 size having the time interval between the M increments in rotation. InterpolatedPeriod(x) is the interval between each N sample and is N×1 in size. Steps 1.1.1.5 through 1.1.2 build up an N×1 vector of phase angles sample by sample. Phase(x) is a vector with a phase angle for each sample as defined in the Table.

Steps 1.2 through 1.2.4 set up a sine cosine series of terms of increasing integral harmonic value, starting with a constant, somewhat like a Fourier series expansion but limited to a finite number of terms depending upon the processing time and power available. In step 1.3 the matrix manipulations shown provide a Result which is the portion of the InputData(x) vector that is periodic. The non-periodic portion is then the InputData(x) vector minus the Result vector.

An alternative procedure for separating the periodic and non-periodic components is shown with respect to the processing algorithm of steps 2.1 through 2.4.2. Steps 2.1 through 2.1.2 achieve the same result in substantially the same way as prior steps 1.1 through 1.1.2. Thereafter the processing uses a data shifting technique in the steps of section 2.2. To understand this, it is to be noted that the N samples are taken continuously with the marker defining each increment in M, the rotation marker falling typically somewhere with an interval between two samples. An array is established with each row having data between successive M markers, thus having the data for each revolution but not synchronized to the M markers because this is not a synchronous system. That is, the M markers can occur at any point in the interval between the first and second data elements of each row, meaning the first element is data from the end of the prior rotation and the second element is data from the first sample of the next rotation. Step 2.2 realigns the data by interpolating the data to its value at the marker in the first interval and continues to interpolate the data in each interval to the value at a corresponding phase angle along each row of the array. This provides the array InterpolatedData(x).

The subsequent steps 2.3 through 2.3.2 are a technique of taking the value of InterpolatedData at the mean of the phase angle to achieve the result PeriodicPart(x). This is the periodic component. The non-periodic component is then obtained as the difference with the InputData(x) as before.

TABLE I

| | |
|---|---|
| 1. | PERIODIC BASIS ELEMENT METHOD |
| | The basic notion for the separation is to assume the following: |
| | The periodic and non-periodic components of the signal are additive. |
| | The periodic component may be represented by a linear combination of a small number of trigonometric functions that are periodic in the rotation interval. |
| | The rotational period of the element (hereinafter DUT) varies slowly with respect to rotation rate. |
| | The periodic component may be adequately extracted by a least-squares fitting of the linear combination representation to the data. |
| | The signal processing path is then given by: |
| 1.1 | Determine phase angle of fundamental periodic component. This is to match the data sampling clock to the rotational period of the DUT |
| 1.1.1 | Interpolate rotational period. |

TABLE I-continued 1.1.1.1 We have N data points collected: InputData (x)
1.1.1.2 We have M Measurements of the period, measured in data sample intervals: Period (y)
1.1.1.3 We have M measurements indicating at what sample time the period measurement was made: TimeOfPeriod (y)
1.1.1.4 Create an array of interpolated periods of size N, InterpolatedPeriod (x)
1.1.1.5 For each x0, a time sample for Interpolated Period, find y0, such that TimeOfPeriod (y0) is less than or equal to x0, and TimeofPeriod (y0 + 1) is greater than x0.
1.1.1.6 Linearly interpolate to get:
InterpolatedPeriod (x0) = Period (y0) + (Period (y0 + 1) − Period (y0)) * (x0 − TimeOfPeriod (y0))/(TimeOfPeriod (y0 + 1) − TimeOfPeriod (y0));
1.1.2 Recursively calculate phase angle of fundamental
Create an array of interpolated phases of size N, Phases (x)
Phases (1)= 0;
Phases (x + 1) = Phases (x) + 2*pi/InterpolatedPeriod (x)
1.2 Calculate a set of trigonometric functions to represent the periodic part
1.2.1 We will use P harmonics (including the $0^{th}$ harmonic) to represent the signal. Create an array PeriodicBasis of size N x (2P + 1)
1.2.2 PeriodicBasis (x, 1) = 1 for all x
1.2.3 PeriodicBasis (x, y) = cos (x*phases (x)*y/2) for y even
1.2.4 PeriodicBasis (x, y) = sin (x*phases (x)*((y − 1)/2)) for y odd
1.3 Perform least-squares fit and periodic representation.
A linear combination of the periodic basis functions may be written in matrix notation as a product of the PeriodicBasis matrix times a vector T:
LinearCombination = PeriodicBasis*T, where T is a (2P + 1) vector.
The least-squares solution minimizes the sum of squares of the difference between the linear combination and the original data:
J = (PeriodicBasis*T − Input Data)$^t$ (PeriodicBasis*T − InputData), where the t superscript denotes matrix transpose.
Taking the gradient of J with respect to T, and solving for zero yields:
T = (PeriodicBasis$^t$PeriodicBasis)$^{−1}$ (PeriodicBasis$^t$InputData), where the −1 superscript indicates matrix inversion. Substituting this value of T back into the formula for the LinearCombination yields our final periodic representation:
Result = PeriodicBasis (PeriodBasis$^t$PeriodicBasis)$^{−1}$ (PeriodicBasis$^t$InputData)
This Result is our final representation of the periodic part of the signal. In the preferred software embodiment, the language will permit use of a matrix representation class to directly implement this equation.
1.4 Calculate non-periodic part
The non-periodic portion of the signal is simply represented as the original signal minus the periodic signal result.
2. ENSEMBLE FRAME AVERAGING METHOD
The basic notion for the separation is to assume the following:
The periodic and non-periodic components of the signal are additive.
The rotational period of the DUT varies slowly.
The non-periodic component may be removed by treating each revolution's data as a strip, lining all the strips on top of each other, and then averaging together.
The signal processing path for this algorithm is given by:
2.1 Determine phase angle of each sample
This is to match the data sampling clock to the rotational period of the DUT
2.1.1 Interpolate rotational period
2.1.1.1 We have N data points collected: InputData (x)
2.1.1.2 We have M measurements of the period, measured in data sample intervals: Period (y)
2.1.1.3 We have M measurements indicating at what sample time the period measurement was made: TimeOfPeriod (y)
2.1.1.4 Create an array of interpolated periods of size N, InterpolatedPeriod (x)
2.1.1.5 For each x0, a time sample for Interpolated Period, find y0, such that TimeOfPeriod (y0) is less than or equal to x0, and TimeOfPeriod (y0 + 1) is greater than x0.
2.1.1.6 Linearly interpolate to get:
InterpolatedPeriod (x0) = Period (y0) + (Period (y0 + 1) − period (y0))* (x0 − TimeOfPeriod (y0))/(TimeOfPeriod (y0 + 1) − TimeOfPeriod (y0)):

TABLE I-continued

| | |
|---|---|
| 2.1.2 | Recursively calculate phase angle of fundamental<br>Create an array of interpolated phases of size N, Phases (x)<br>Phases (1) = 0;<br>Phases (x + 1) = Phases (x) + 1/InterpolatedPeriod (x)<br>(note the units are in fractions of a revolution) |
| 2.2 | Interpolate input data to have uniform angular spacing |
| 2.2.1 | BasePeriod = round (Interpolatedperiod (1)) |
| 2.2.2 | NumRevolutions = floor (N/BasePeriod) |
| 2.2.3 | Create an array InterpolatedData of length<br>NumRevolutions*Baseperiod |
| 2.2.4 | For each element x of InterpolatedData, find y such<br>that Phases (y) is less than or equal to x/BasePeriod and<br>Phases (y + 1) is greater than x/BasePeriod |
| 2.2.5 | Interpolate the data:<br>InterpolatedData (x) = InputData (y) + (InputData (y + 1) − InputData (y))*<br>((x/BasePeriod) − Phases (y))/(Phases (y + 1) − Phases (y)) |
| 2.3 | Perform frame averaging to determine periodic part |
| 2.3.1 | Create the array PeriodicPart of length BasePeriod |
| 2.3.2 | Each element x of PeriodicPart is the mean of the<br>corresponding angle in the Interpolated Data<br>$$\text{PeriodicPart}(x) = \frac{\sum_{y=0}^{\text{NumRevolutions}-1} \text{InterpolatedData}(x + (y * \text{BasePeriod}))}{\text{NumRevolutions}}$$ |
| 2.4 | Remove the periodic part to determine the non-periodic part |
| 2.4.1 | Create an array NonPeriodicPart of length<br>NumRevolutions*Baseperiod |
| 2.4.2 | Subtract the appropriate periodic part from the input data:<br>NonPeriodicPart (x) = InterpolatedData (x) − PeriodicPart (1 + ((x − 1)mod BasePeriod)) |

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. A process for obtaining the periodic component in a data vector of data taken of a sensed property of a rotated unit under test over several rotations comprising the steps of:

forming said data vector asynchronously with respect to rotation of said rotated unit under test;

receiving marker signals representing the rotation of the rotated unit under test;

determining the periodic component of data in said data vector as a function of the data in said data vector and said marker signals; and determining the non-periodic component of data in said data vector by removing said periodic component of data from said data vector.

2. The process of claim 1 further including the step of establish a phase angle relation between data in the data vector and the marker signals and wherein said determining step includes determining the periodic component as a function of said phase angle relation.

3. The process of claim 1 wherein said determining step further includes the step of fitting the data in said data vector to a sine/cosine series.

4. The process of claim 1 wherein said determining step further includes:

forming an interpolated data vector containing data points synchronous with respect to rotation of said rotated unit under test; and determining the periodic component of data in said data vector as a function of the data in said interpolated data vector.

* * * * *